United States Patent
Konno

(10) Patent No.: US 6,852,051 B2
(45) Date of Patent: Feb. 8, 2005

(54) TENSIONER LEVER FOR TRANSMISSION DEVICE

(75) Inventor: Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 151 days.

(21) Appl. No.: 10/218,295

(22) Filed: Aug. 14, 2002

(65) Prior Publication Data

US 2003/0040385 A1 Feb. 27, 2003

(30) Foreign Application Priority Data

Aug. 22, 2001 (JP) ........................................ 2001-251845

(51) Int. Cl.⁷ .............................. F16H 7/08; F16H 7/18
(52) U.S. Cl. ...................................... 474/111; 474/140
(58) Field of Search .................................. 474/140, 111, 474/101

(56) References Cited

U.S. PATENT DOCUMENTS

| | | | | |
|---|---|---|---|---|
| 5,266,066 A | * | 11/1993 | White | 474/111 |
| 5,813,935 A | * | 9/1998 | Dembosky et al. | 474/111 |
| 6,024,402 A | * | 2/2000 | Wheatley | 296/100.18 |
| 6,303,197 B1 | * | 10/2001 | Hodgetts | 428/33 |
| 6,322,471 B1 | * | 11/2001 | Hashimoto | 474/140 |

FOREIGN PATENT DOCUMENTS

| | | | | |
|---|---|---|---|---|
| DE | 3525746 A1 | * | 1/1987 | F16H/7/08 |
| FR | 2736123 A1 | * | 1/1997 | F16H/7/08 |
| JP | H4-119652 | | 10/1992 | |
| JP | H5-42798 | | 6/1993 | |
| JP | 08-226506 A | * | 9/1996 | F16H/7/08 |
| JP | 10-311395 A1 | * | 11/1998 | F16H/7/18 |
| JP | 11201246 A | | 7/1999 | |
| JP | 2000-337462 A | * | 12/2000 | F16H/7/08 |
| JP | 2000-346154 A | | 12/2000 | |
| JP | 2001-108031 A | * | 4/2001 | F16H/7/08 |
| JP | 2001-141004 A | * | 5/2001 | F16H/7/18 |
| JP | 3253951 | | 11/2001 | |
| JP | 2002-266964 | | 9/2002 | |

* cited by examiner

Primary Examiner—Marcus Charles
(74) Attorney, Agent, or Firm—Howson and Howson

(57) ABSTRACT

A tensioner lever for a chain or belt power transmission comprises a resin shoe having a shoe surface on which the chain or belt slides, and a back surface with a plunger-engaging part adjacent one end and a lever shaft bearing adjacent the other end. A shape-retaining groove extends longitudinally along the shoe through the plunger engaging part and the lever shaft bearing. A part of a strength-maintaining plate is fits in the shape-retaining groove and a part of the strength-maintaining plate is exposed.

Simplification and weight reduction in the tensioner lever can be realized, and molding accuracy requirements are reduced. Assembly is simplified by pawls formed in openings in a side wall of the shoe, which cooperate with locking holes in the strength-maintaining plate. The pawls simplify disassembly for recycling and may be notched so that they can be broken away. A projection is provided on the plunger-engaging part of the shoe for limiting lateral deviation of the lever relative to the tensioner plunger.

3 Claims, 11 Drawing Sheets

TENSIONER LEVER FOR TRANSMISSION DEVICE

BACKGROUND OF THE INVENTION

This invention relates to a tensioner lever used for guiding and tensioning a chain or belt in a transmission device. The transmission device may be a device that transmits power from a driving sprocket to a driven sprocket through an endless chain or toothed belt engaged with both sprockets, or a device that transmits power from a driving pulley to a driven pulley by an endless belt engaged with both pulleys.

Various machines, for example internal combustion engines, include a transmission device that transmits power through an endless chain, a belt or the like that travels in a closed loop. In such a transmission device, a tensioner lever, as shown in FIG. 9, FIG. 10, or FIG. 11, is used to apply appropriate tension to the belt or chain while in sliding contact with the belt or chain. The tensioner lever also functions to prevent vibration of the chain or belt, including vibration in the plane of the loop and lateral vibration.

Tensioner lever A, shown in FIG. 9, is a two-piece structure comprising a shoe A10, composed of a resin material for engagement with a portion of a travelling chain, and an aluminum die cast base member A20. The base member must be sufficiently strong to hold the shoe A10. (See Japanese patent application No. Hei 11-155672.)

Tensioner lever B, shown in FIG. 10, is a two-piece structure comprising a shoe B10 composed of a resin material for engagement with a portion of a travelling chain, and a steel plate B20 for holding the shoe B10. (see Japanese patent application No. 2001-69238.) The strength of the steel plate is also important in this tensioner lever.

Tensioner lever C, shown in FIGS. 11(a) and 11(b), is a two-piece structure comprising a shoe C10 composed of a resin material for engagement with a portion of a travelling chain, and a base member C20, composed of a resin reinforced with glass fiber or the like, for holding the shoe C10. Here again, the strength of the base member is important.

Each of these conventional tensioner levers is in the form of a two-piece structure comprising a shoe and a base member or plate. The properties of the shoe must be such as to permit sliding contact with the chain as the moves in the longitudinal direction along the shoe, while resisting wear. The base member or plate must have sufficient mechanical strength to hold the shoe. By appropriate selection of materials for the respective members, properties such as the sliding contact properties, wear resistance, mechanical strength and the like, required for the tensioner lever, are combined with one another with a high degree of compatibility. However, these conventional tensioner levers have the following problems.

In the tensioner lever A shown in FIG. 9, the strength of the base member A20, which is made of die cast aluminum, is low, and the walls of the base member A20 must be made relatively thick to achieve sufficient rigidity. Even if the base member A20 is molded with unnecessary portions cut out, it occupies a large volume, and therefore it is not possible to produce a practical, light weight lever having this structure. Furthermore, the production cost, especially the cost of materials and molding, is high. In addition, since a plurality of hooks A11 is required for securing the shoe A10 to the base member A20 assembly of the shoe, assembly is difficult.

In the tensioner lever B shown in FIG. 10, in which a steel plate B20 is used as a base member, even though the wall thickness of the plate can be less than that of the die cast aluminum base member of FIG. 9, and even though the shoe is formed with ribbed sidewalls, in order to achieve sufficient strength, the weight of the steel plate is necessarily relatively high. Consequently, in this case it is also impossible to achieve a practical, light weight lever. Furthermore, in order to secure the plate member B20 on the shoe B10 reliably, it is necessary to match the width of the plate-inserting slot B11 on the back of the shoe B10 accurately with the thickness of the plate member B20. Thus high molding accuracy is required for producing the shoe B10. It is also difficult to insert the plate member B20 into the shoe B10.

In the tensioner lever C shown in FIG. 11, since all the parts are composed of resin, the tensioner lever C is lighter than the tensioner levers of FIGS. 9 and 10. However, because of the complex shape of the base member C20, injection molding of the base member is time-consuming, and the production cost of the tensioner lever C is substantially the same as that of the tensioner lever utilizing a die cast aluminum base. Furthermore, as mentioned previously, because a plurality of hooks C11 is required for securing the base member C20 and the shoe C10, assembly time is relatively high.

Further, in recent years, environmental concerns have brought about requirements for recycling of automobile parts. However, in recycling the above-described conventional tensioner levers, separation of the shoes from the base members or plates is complex, and consequently, recycling is difficult.

As a result of as study of tensioner levers using advanced methods of structure analysis and stress analysis, the inventor has made a surprising determination. Contrary to the common belief that the shoe in a tensioner lever must both play a chain guiding role and also contribute to the overall mechanical strength of the lever, it has been found that the mechanical strength of the tensioner lever is almost entirely a function of the base member or the plate member, and that the shoe plays only a guiding role for the chain or belt.

SUMMARY OF THE INVENTION

Accordingly, a general object of the invention is to provide a tensioner lever for a transmission device in which both a simplification of the tensioner lever and a weight reduction therein are attained, molding accuracy requirements and assembly effort are reduced, and easy disassembly can be carried out, making the lever more suitable for recycling.

A tensioner lever according the invention comprises an elongated resin shoe having a shoe surface on which a chain or a belt slides longitudinally, and a back surface. The back surface has a plunger-engaging portion for free engagement with the plunger of a tensioner and the application of pressure to the shoe by the plunger. The back surface of the shoe also has a lever shaft bearing portion through which a lever mounting shaft can extend. The plunger engaging portion and the lever shaft bearing portion are located respectively near distal and proximal ends of the shoe. A shape-retaining groove is also provided in the shoe, extending along the longitudinal direction of the shoe through said plunger-engaging portion and said lever shaft bearing portion. A strength-maintaining plate is also provided. A part of the strength-maintaining plate is fitted in the shape-retaining groove and a part of the strength-maintaining plate is exposed.

Since the shape-retaining groove formed on the back surface of the shoe is fitted to a part of the strength-maintaining plate, deformation of the shoe due to heat in the high temperature environment encountered in an engine is limited. As a result, the shape of the surface of the shoe is stabilized and, at the same time, deviation of the shoe from its proper position and failure due to separation of the shoe from the plate resulting from continuous vibration of the chain or belt, are suppressed.

Locking pawls for locking the shoe to the strength-maintaining plate are respectively provided in a cut-out side wall on one side of said plunger engaging portion and a cut-out side wall on one side of said lever shaft bearing portion. Locking holes which engage with said locking pawls are provided in the strength-maintaining plate.

The locking pawl structure reliably attaches the strength-maintaining plate to the shoe by utilizing the elasticity of the locking pawls which are provided as part of the resin shoe. However, the locking pawl structure also provides for easy separation of the resin shoe from the strength-maintaining plate in disassembly, since the locking pawl can be bent by means of a tool such as a screwdriver to release the engagement of the locking pawl with the strength-maintaining plate.

In a preferred embodiment of the tensioner lever, separation and disassembly notches are provided on proximal portions of the locking pawls, allowing the pawls to be broken off in the process of disassembly of the lever, thereby reducing the effort required to separate the shoe from the strength-maintaining plate in the disassembly operation.

A projection for limiting lateral deviation of the shoe relative to the plunger of a tensioner is preferably provided on the plunger engaging portion of the shoe. The deviation-limiting projection allows the lever to move reliably with forward and backward movement of the plunger of the tensioner, without lateral deviation.

BRIEF DESCRIPTION OF THE DRAWINGS

A preferred embodiments of the invention will now be described in detail, by way of example only, with reference to the accompanying drawings, in which.

DETAILED DESCRIPTION OF THE PREFERRED EMBODIMENT

Figure 1:
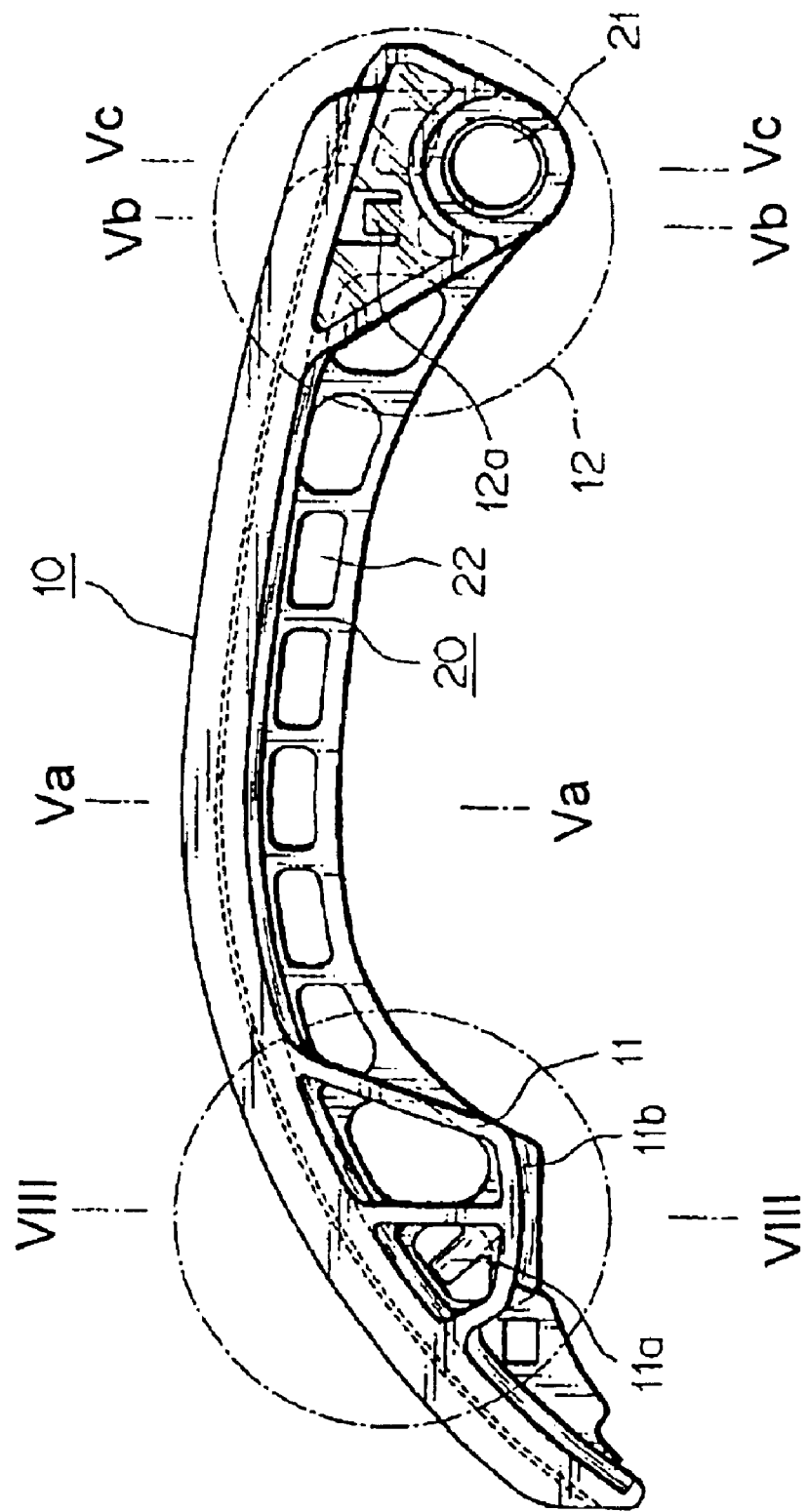
FIG. 1 is a schematic view of an exemplary tensioner lever for a transmission device in accordance with a preferred embodiment of the invention.

The tensioner lever shown in FIG. 1 is a two-piece structure comprising a resin shoe 10 shaped to receive chain which slides along the shoe in a longitudinal direction, and a strength-maintaining plate 20, mountable on a wall of an engine enclosure, for supporting the shoe.

Figure 2:
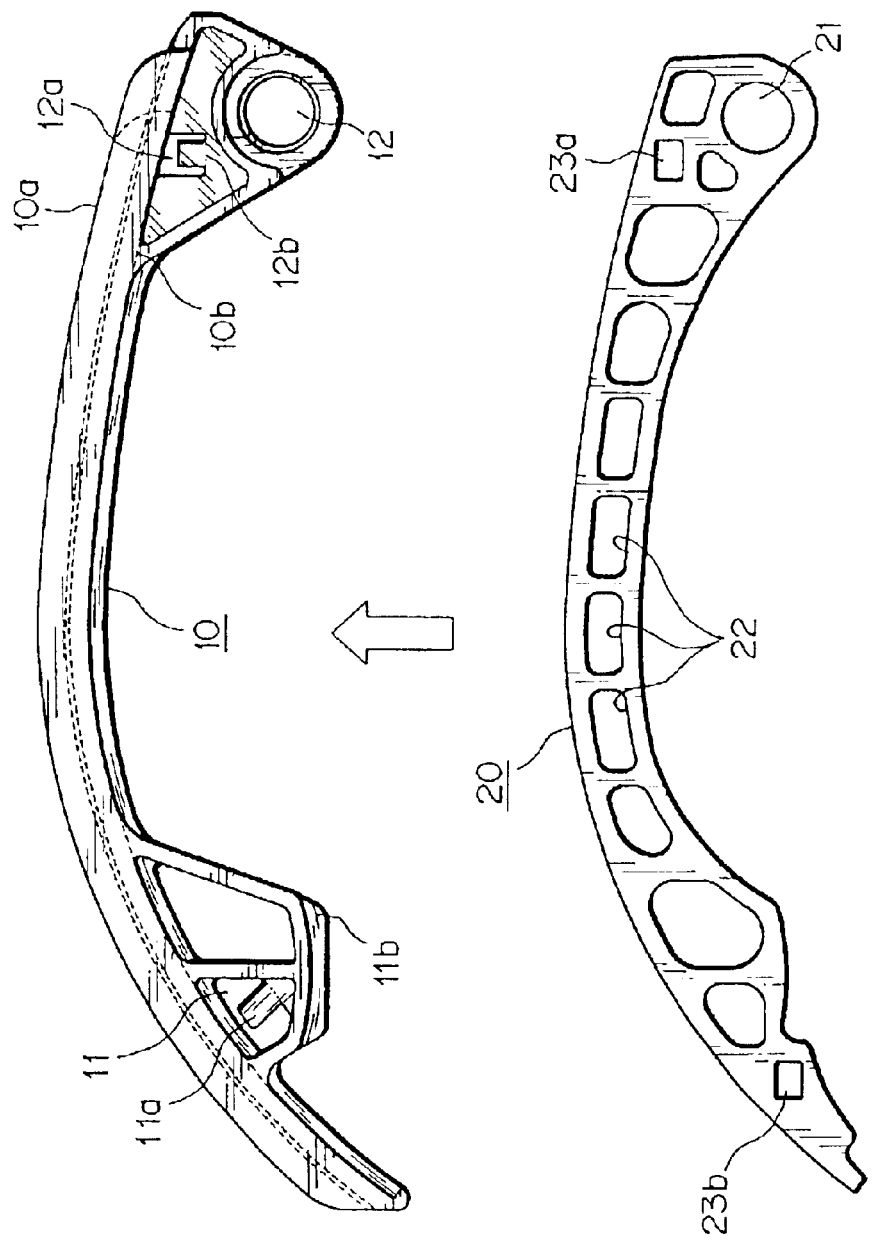
FIG. 2 is an exploded view in the tensioner lever of FIG. 1, illustrating the configuration of the parts.

As shown in FIG. 2, the shoe 10 has a front surface 10a on which the chain slides in a longitudinal direction, and a back surface 10b having a plunger engaging portion 11 which can be contacted freely by the plunger T1 (FIG. 8) of a tensioner under pressure, and a shaft bearing portion 12 through which a mounting shaft (not shown) extends, the mounting shaft being typically fixed to a wall of an engine enclosure. The plunger receiving portion 11 and the shaft bearing portion 12 are respectively formed near a distal end of the shoe and a proximal end thereof. A concave, shape-retaining groove 13 is formed along the longitudinal direction of the lever, as shown in FIGS. 5(a), 5(b), 6, 7, and 8. The groove extends through the plunger receiving portion 11 and also through the lever shaft bearing portion 12.

The material of the resin shoe may be polymer resin material having good wear-resisting and heat-resisting properties. For example, commercially available polymer resin materials such as Nylon 6, Nylon 66, Nylon 46 and all aromatic nylons and the like, may be utilized.

Figure 8:
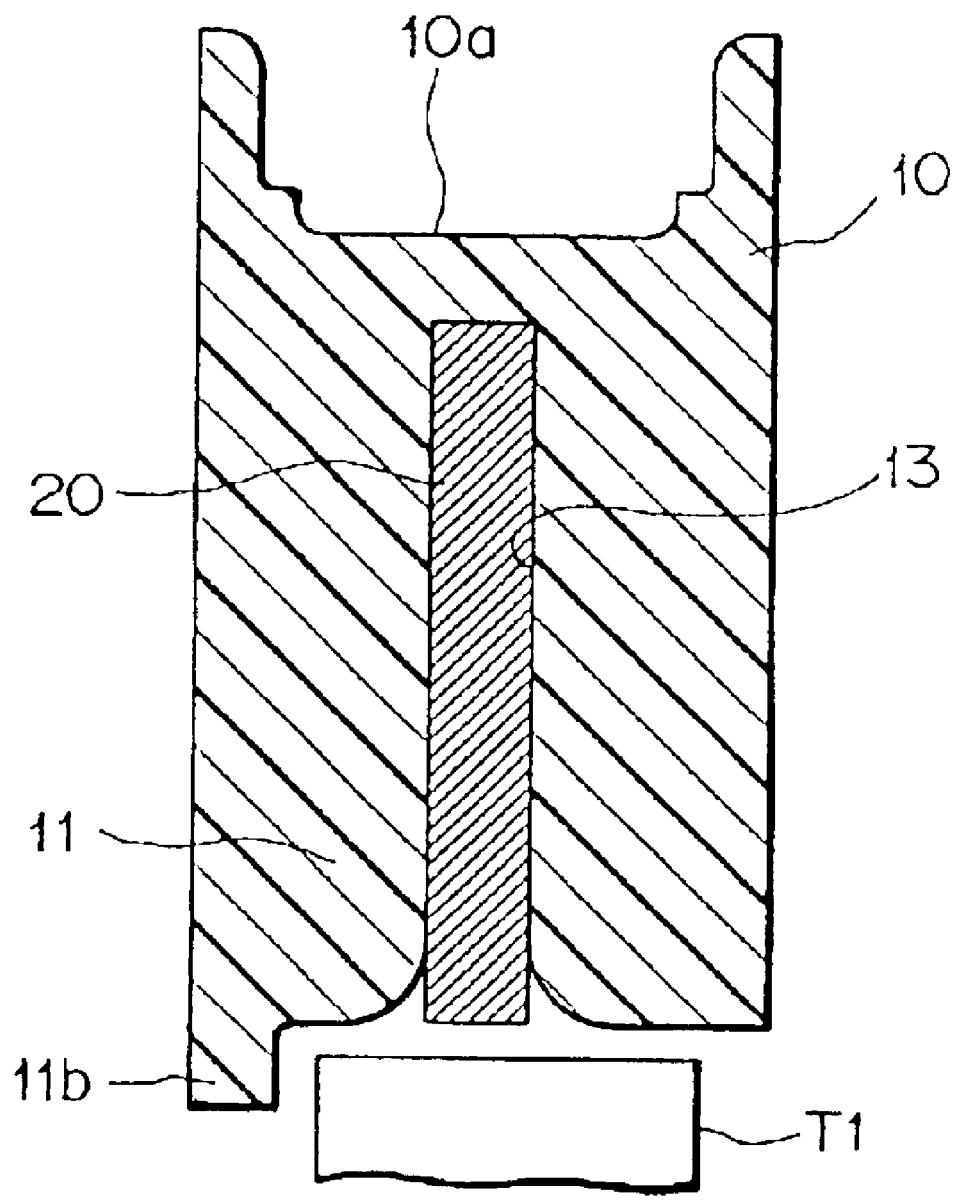
FIG. 8 is a cross-sectional view taken on plane VIII—VIII in FIG. 1.
Figure 9:
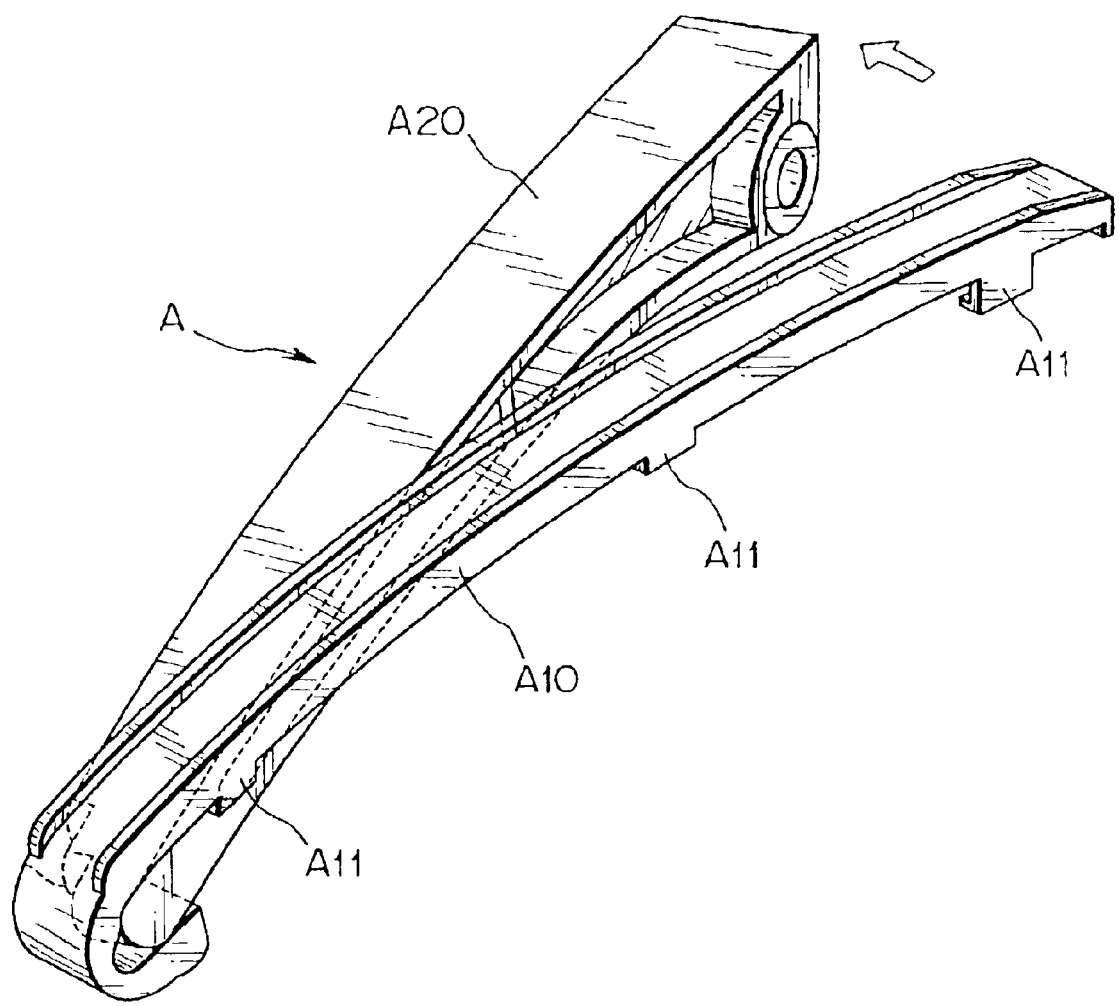
FIG. 9 is an oblique perspective view of a conventional tensioner lever for a transmission device.
Figure 10:
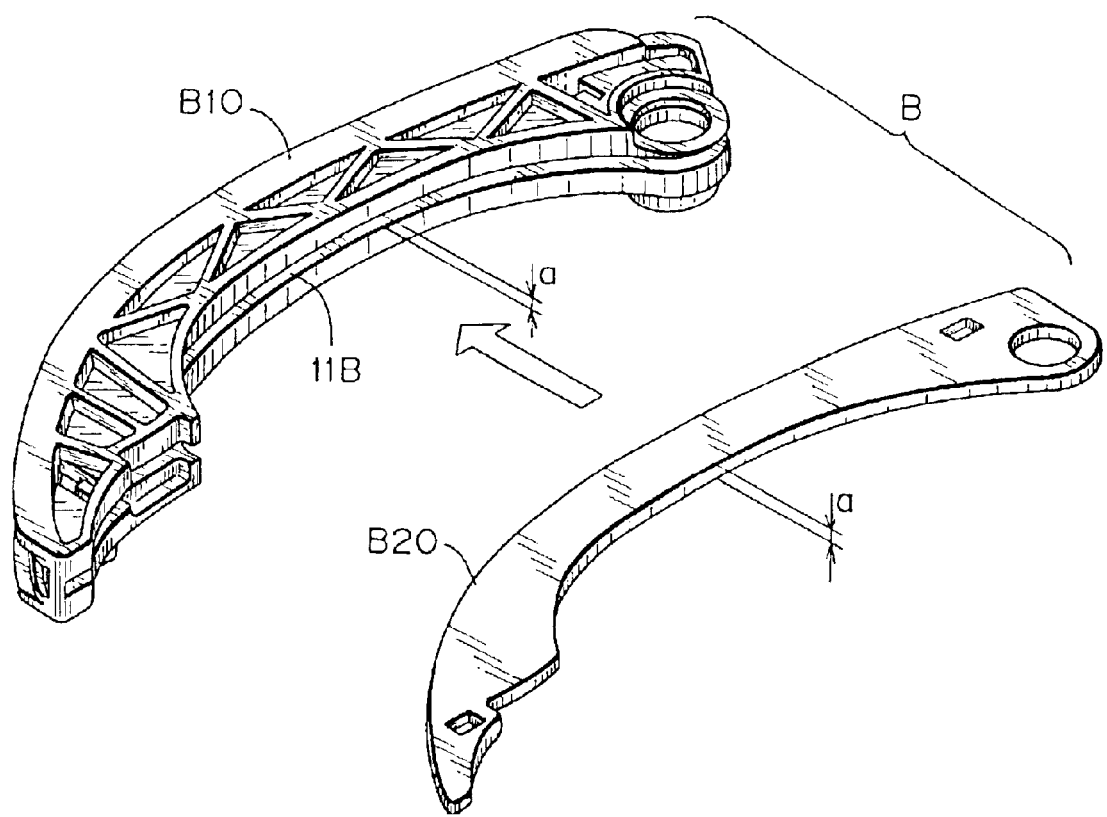
FIG. 10 is an exploded, oblique perspective view showing another conventional tensioner lever.
Figure 11A:
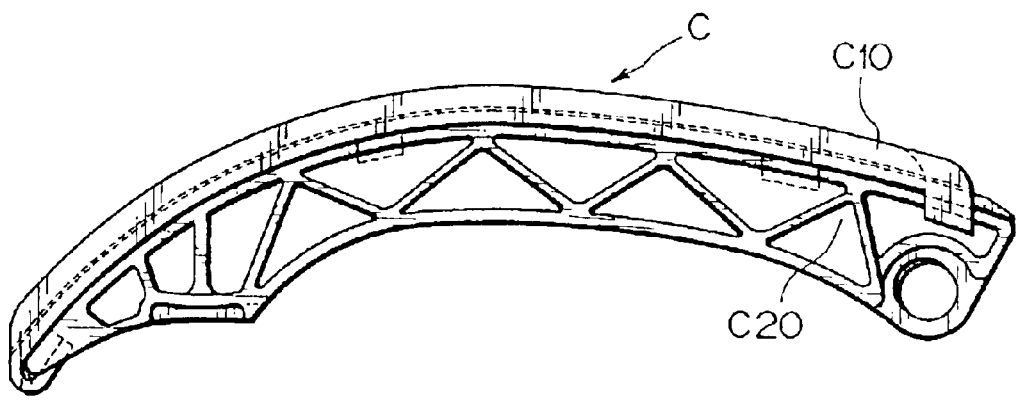
FIG. 11(a) is a side elevational view of still another conventional tensioner lever.
Figure 11B:
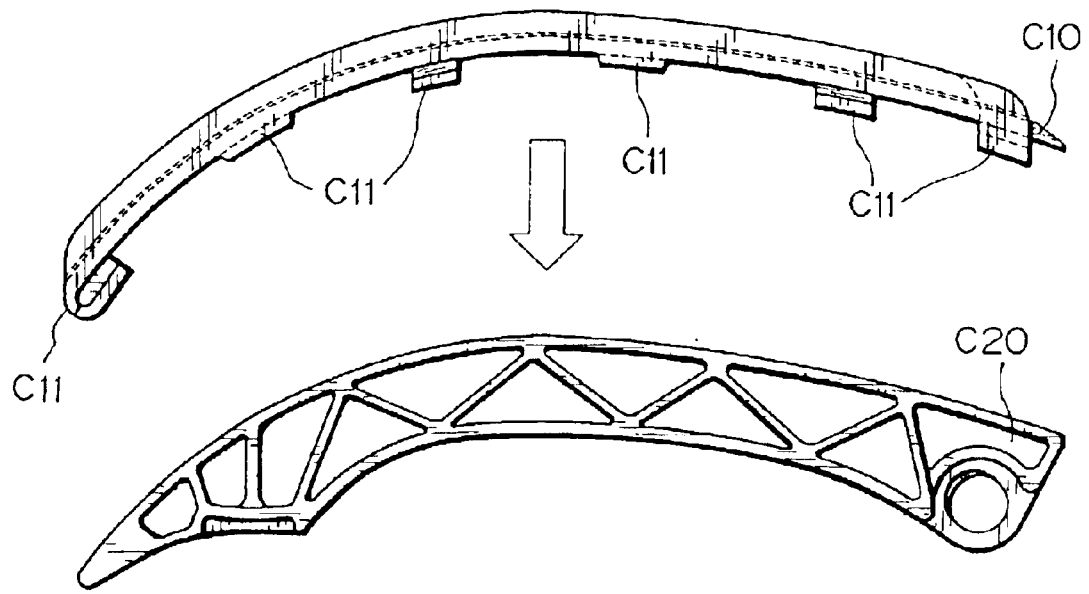
FIG. 11(b) is an exploded view showing the parts of the lever of FIG. 11(a) separated from each other.

As best shown in FIG. 8, the opening of the shape-retaining groove 13 on the back surface of the shoe 10 is chamfered, the edges of the opening being of arcuate shape. The chamfering of the opening facilitates the fitting of the strength-retaining plate 20 into the opening during assembly of the shoe.

Figure 5A:
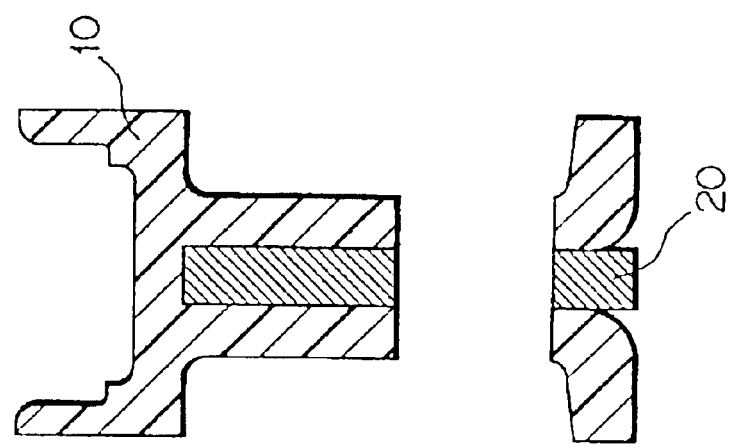
FIGS. 5(a), 5(b) and 5(c) are cross-sectional views of the tensioner lever of FIG. 1, taken on planes Va—Va, Vb—Vb, and Vc—Vc, respectively in FIG. 1.
Figure 5B:
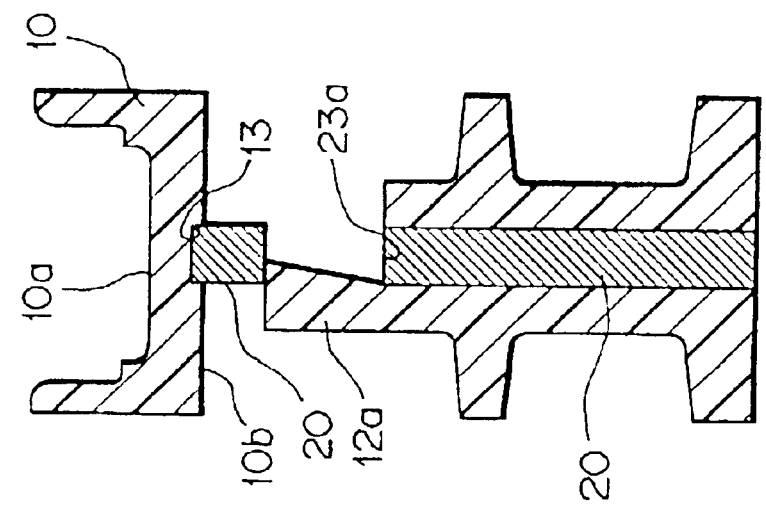
Figure 5C:
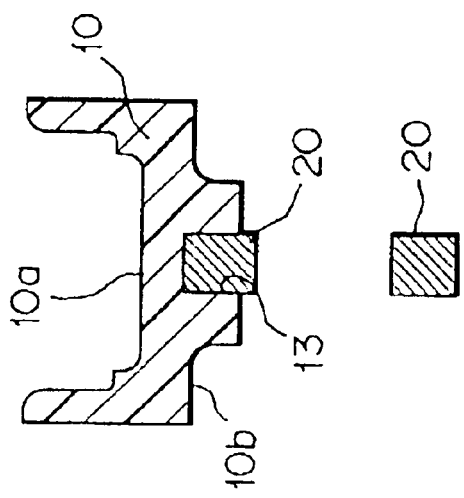

The strength-maintaining plate 20 is substantially crescent-shaped, and the thickness of the plate 20 is substantially the same as the width of the shape-retaining groove 13, so that an edge of the plate can fit into the shape-retaining groove along the length of the groove, while most of the part of the plate situated between the plunger-engaging portion 11 and the shaft bearing portion 12 is exposed, as shown in FIG. 5(a). Although die cast aluminum is preferred as the material for the strength-maintaining plate 20, reinforced plastics or a sheet steel plate may be used if the material can maintain sufficient strength.

As shown in FIG. 2, the plate 20 is provided with a through hole 21 through which a lever mounting shaft (not shown), extends. The weight of the plate 20 can be significantly reduced by appropriately providing cut out openings 22.

Since one edge of the strength-maintaining plate 20 fits into the shape-retaining groove 13 which extends longitudinally along the back surface 10a of the shoe, even though there is no side wall for maintaining the strength of the resin shoe, no rattling due to torsion stress occurs, and the resin shoe 10 and the strength-maintaining plate 20 can be reliably connected together.

Figure 3:
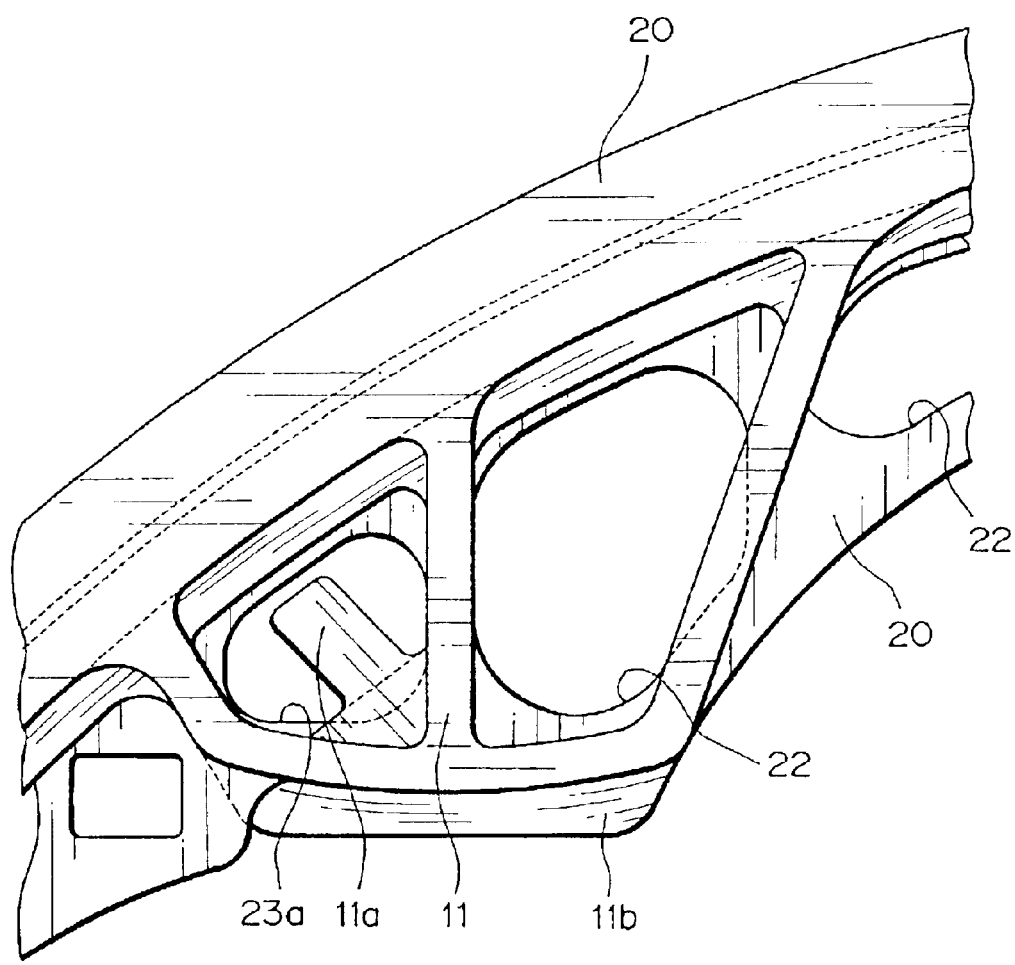
FIG. 3 is an enlarged view of a plunger-receiving portion of the lever.
Figure 4:
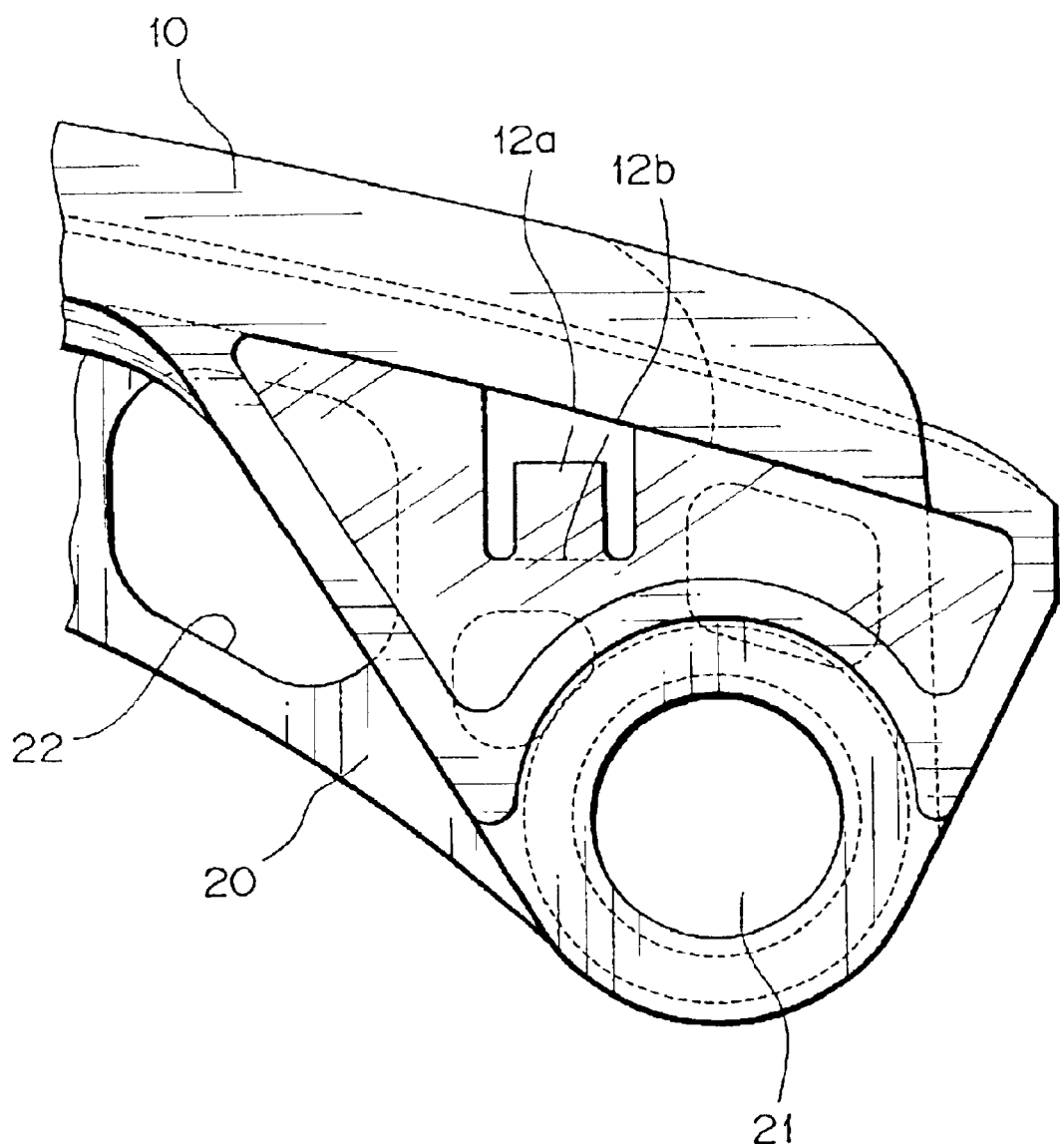
FIG. 4 is an enlarged view of a shaft-bearing portion of the lever.

A structure for connection of the resin shoe 10 with the strength-maintaining plate 20 is shown in FIGS. 3 and 4. A locking pawl 11a is provided on one side wall of the plunger engaging portion 11 near the distal end by cutting out a part of a side wall. A locking hole 23a is provided in the strength-maintaining plate 20 at a position opposite to the locking pawl 11a. Another locking pawl 12a is provided a side wall of the lever shaft bearing portion 12 at the proximal end by cutting out a part of the side wall, and a locking hole 23b is provided in the strength-maintaining plate 20 at a position opposite to the locking pawl 12a.

The shoe 10 can be reliably attached to the strength-maintaining plate 20 by utilizing, in the assembly of the tensioner lever, the elasticity of the locking pawls 11a and 12a, which are cammed to the side when the strength-maintaining plate is inserted into the groove of the shoe, and then snap into engagement with the locking holes 23b and 23a, respectively. The use of these locking pawls not only facilitates assembly of the tensioner lever, but also improves its durability.

Figure 6A:
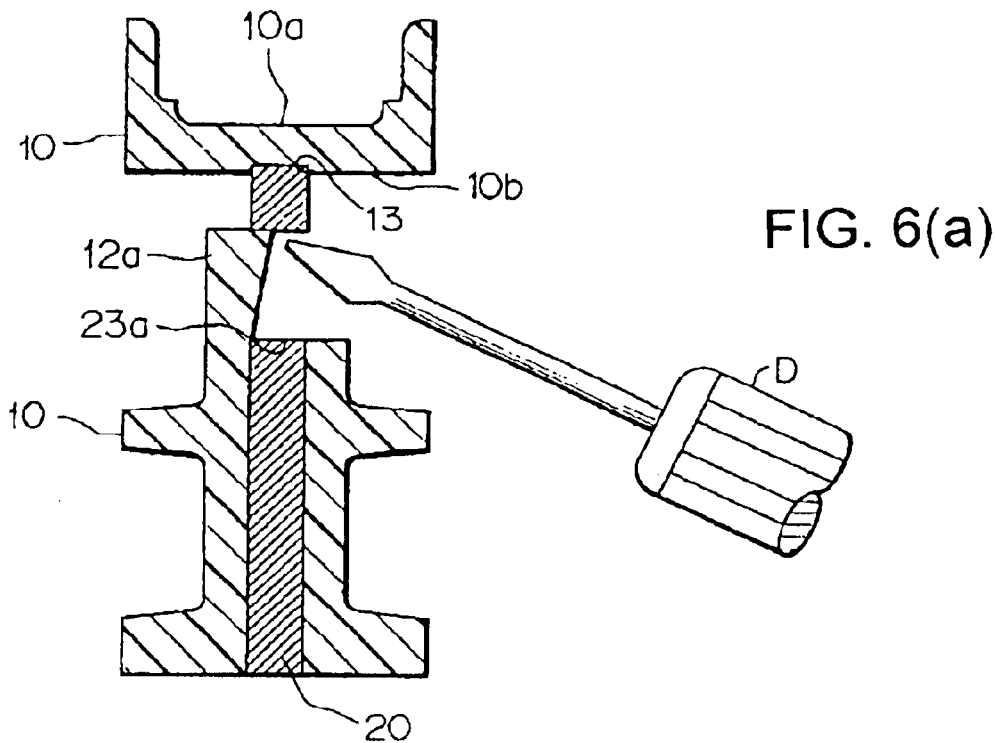
FIGS. 6(a) and 6(b) are explanatory sectional views, corresponding to FIG. 5(b) and also taken on Plane Vb—Vb of FIG. 1. illustrating successive steps in a first example of a disassembly method.
Figure 6B:
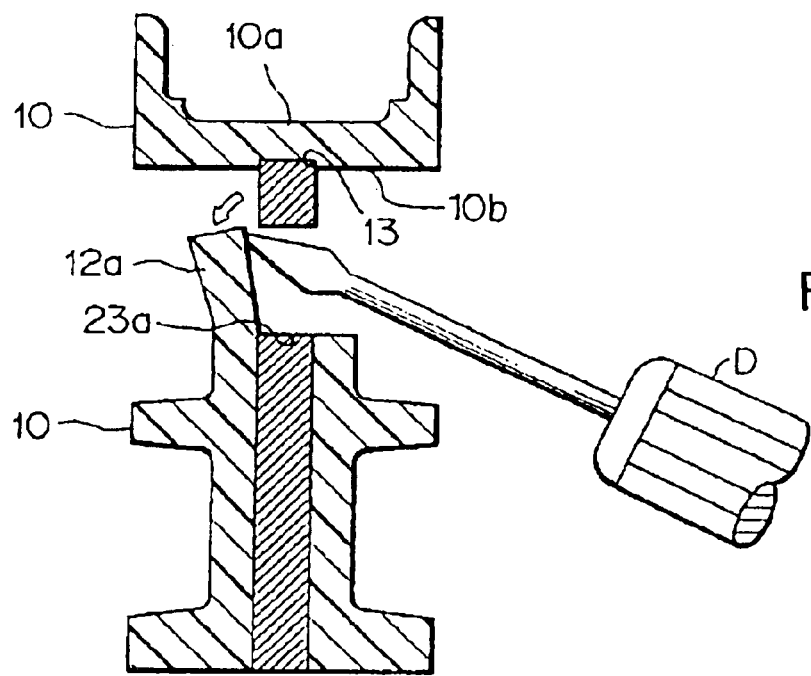

The above-described connection structure enables a used tensioner lever to be disassembled easily. A method of disassembling the tensioner lever is illustrated in FIG. 6.

To disassemble the tensioner lever by separating the shoe from the strength-maintaining plate, the locking relationship between the shoe 10 and the strength-maintaining plate 20 can be released by inserting a narrow tool, such as a screwdriver D, through the side of the shoe opposite the side on which the locking pawl 12a is located, and pressing the pawl outward to separate it from the locking hole 23a.

Figure 7A:
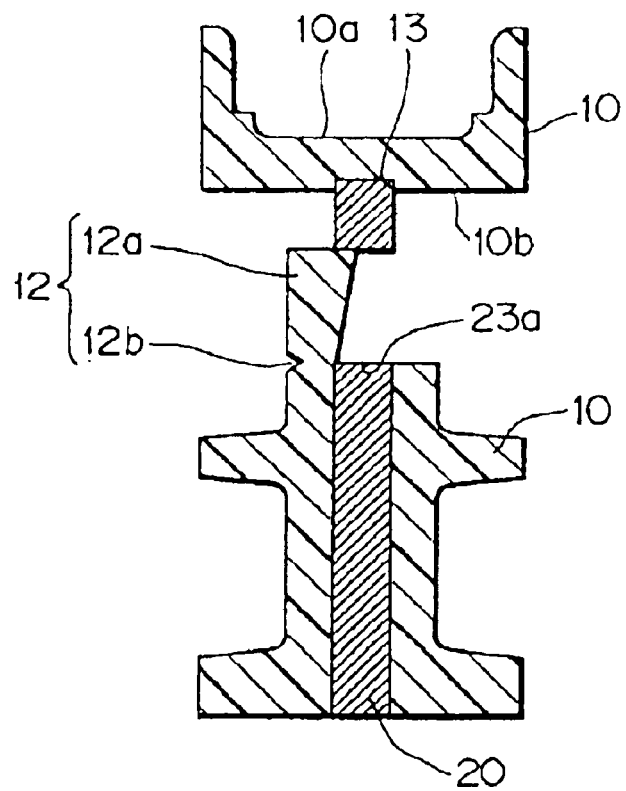
FIGS. 7(a) and 7(b) are explanatory sectional views, taken through a modified tensioner lever on a section plane corresponding to section plane Vb—Vb in FIG. 1. and illustrating successive steps in another example of a disassembly method.
Figure 7B:
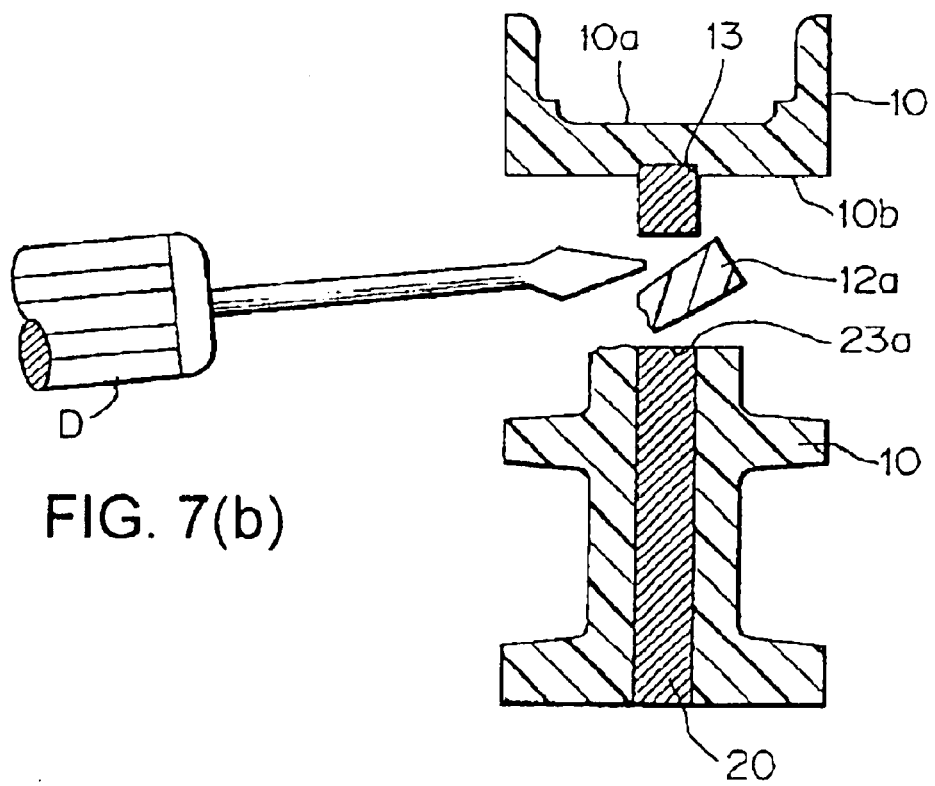

Since the locking pawl 12a, which is integrally molded with the resin shoe 10, is also composed of synthetic resin, it is not necessary to exert a large force in order to bend the locking pawl into its releasing position. However, as shown in FIG. 7, a notch 12b may be provided at the base of the pawl 12a as shown in FIG. 7. If such a notch is provided, the locking pawl 12a can be released by a still smaller force, exerted by a screwdriver D, which may be inserted from the side of the pawl on which the notch is located, thereby breaking off the pawl and causing the pawl to separate from the locking hole. Thus, the separation of the resin shoe 10 and the strength-maintaining plate 20 can be performed easily, and recycling of used tensioner levers is promoted.

Since a similar connection structure is also utilized at the opposite end of the lever, as shown in FIG. 3, the locking of the shoe to the strength-maintaining plate at the plunger engaging location can also be released easily.

As shown in FIG. 8, a projection 11b of the side wall serves to limit lateral deviation of the lever relative to plunger T1. Thus, the tensioner lever is moved reliably by forward and backward movement of the plunger T1 without deviating laterally with respect to the plunger, and chain tension can be accurately adjusted, so that the reliability of the tensioner lever is further improved.

Although the invention has been described in the context of a lever which cooperates with a tensioner, the invention is also applicable to guides for chains or belts which do not cooperate with tensioners.

The structure of the tensioner lever, in which a resin shoe having a shape-retaining groove cooperates with a strength-maintaining plate a part of which is fitted in the groove portion and a part of which is exposed, simplifies the shape of the lever, achieves a weight reduction, and at the same time reduces mold accuracy requirements, reduces molding time, and significantly reduces production cost. Furthermore, deformation of the shoe due to heat is limited, a stable shoe surface is provided, and failure of the lever due to vibration is avoided. Therefore, the reliability of the tensioner lever is significantly improved.

The locking pawls which are provided in cut-out walls on one side of the plunger engaging portion and the lever shaft bearing portion of the shoe allow the shoe to be attached reliably to the strength-maintaining plate during assembly and improve the durability of the tensioner lever. Additionally, the pawls make it possible to separate the shoe from the strength-maintaining plate in disassembly of the lever, by an easy operation in which the pawls are pressed by a tool, such as a screwdriver, to release their engagement with locking holes in the strength-maintaining plate. Separation and disassembly are further simplified by the provision of notches on proximal portions of the locking pawls so that the pawls can be broken away. As a result, recycling of used tensioner levers is promoted.

Finally, the lateral deviation limiting projection provided on the plunger receiving portion of the shoe allows the lever to move reliably with the plunger, without lateral deviation. As a result the tension of the chain or belt can be precisely adjusted during a power transmitting operation, and the reliability of the tensioner lever is further improved.

Obviously, various minor changes and modifications of the invention are possible in the light of the above teaching. It is therefore to be understood that within the scope of the appended claims, the invention may be practiced otherwise than as specifically described.

What is claimed is:

1. A tensioner lever for a transmission device comprising:

an elongated resin shoe having a shoe surface on which a chain or a belt slides longitudinally, a back surface having a plunger-engaging portion for free engagement with the plunger of a tensioner and the application of pressure to the shoe by said plunger, a lever shaft bearing portion having a pivot axis along which a lever mounting shaft can extend, for receiving said plunger and allowing pivotal movement of said elongated resin shoe on said shaft about said pivot axis, the plunger engaging portion and the lever shaft bearing portion being respectively located near distal and proximal ends of the shoe;

a shape-retaining groove in the shoe, extending along the longitudinal direction of the shoe through said plunger-engaging portion and said lever shaft bearing portion;

a strength-maintaining plate a part of which is fitted in the shape-retaining groove and parts of which, on both the forward side and the rearward side of the plunger-engaging portion, are disposed outside said shape-retaining groove, extend from said shape-retaining groove in the direction of pivotal movement of the shoe, and are thereby exposed; and a projection formed on said plunger-engaging portion of said back surface, and extending from said plunger-engaging portion in a direction of said pivotal movement, said projection extending parallel to, and being spaced laterally from, said shape-retaining groove, and from said strength-retaining elate fitted therein, along a direction parallel to said axis, for engaging a side of a tensioner plunger engaged with said plunger-engaging portion, said projection being the sole projection extending from said plunger-engaging portion in said direction of pivotal movement, and being positioned to limit lateral deviation of the shoe relative to said plunger by engagement with said side of the plunger.

2. A tensioner lever according to claim 1, wherein locking pawls for locking the shoe to the strength-maintaining plate are respectively provided in a cut-out side wall on one side of said plunger engaging portion and a cut-out side wall on one side of said lever shaft bearing portion, and locking holes which engage with said locking pawls are provided in said strength-maintaining plate.

3. A tensioner lever for the transmission device according to claim 2, wherein separation and disassembly notches are provided on the proximal portions of said locking pawls.

* * * * *